United States Patent
Quesada

(10) Patent No.: US 11,365,839 B2
(45) Date of Patent: Jun. 21, 2022

(54) SEALING AND RESTRAINING GASKET FOR USE IN PLASTIC PIPELINES

(71) Applicant: S & B Technical Products, Inc., Fort Worth, TX (US)

(72) Inventor: Guido Quesada, Santa Ana (CR)

(73) Assignee: S & B Technical Products, Inc., Fort Worth, TX (US)

(*) Notice: Subject to any disclaimer, the term of this patent is extended or adjusted under 35 U.S.C. 154(b) by 529 days.

(21) Appl. No.: 16/381,217

(22) Filed: Apr. 11, 2019

(65) Prior Publication Data

US 2019/0331274 A1 Oct. 31, 2019

Related U.S. Application Data

(60) Provisional application No. 62/664,668, filed on Apr. 30, 2018.

(51) Int. Cl.
| | |
|---|---|
| *F16J 15/06* | (2006.01) |
| *F16L 37/084* | (2006.01) |
| *F16L 21/02* | (2006.01) |
| *F16L 37/091* | (2006.01) |
| *F16J 15/12* | (2006.01) |

(52) U.S. Cl.
CPC ......... *F16L 37/0845* (2013.01); *F16J 15/061* (2013.01); *F16J 15/121* (2013.01); *F16L 21/02* (2013.01); *F16L 37/091* (2013.01)

(58) Field of Classification Search
CPC ..... F16L 37/0845; F16L 21/02; F16L 37/091; F16J 15/061; F16J 15/121
See application file for complete search history.

(56) References Cited

U.S. PATENT DOCUMENTS

| | | | | |
|---|---|---|---|---|
| 2,858,453 A | * | 10/1958 | Harris | G01S 3/789 |
| | | | | 250/236 |
| 5,197,768 A | * | 3/1993 | Conner | F16L 37/0842 |
| | | | | 285/105 |

(Continued)

FOREIGN PATENT DOCUMENTS

| | | | | |
|---|---|---|---|---|
| CA | 3048716 A1 | * | 2/2020 | .......... F16L 37/0842 |
| WO | 2011002483 A1 | | 1/2011 | |

OTHER PUBLICATIONS

PCT/US2020/026595, International Search Report, dated Jun. 16, 2020, 2 pages.

*Primary Examiner* — Vishal A Patel
(74) *Attorney, Agent, or Firm* — Whitaker Chalk Swindle & Schwartz PLLC; Charles Gunter

(57) ABSTRACT

A pipe joining system and pipe joint are shown in which two sections of plastic pipe, particularly molecularly oriented pipe, are joined. A ring-shaped elastomeric body is installed within a mating groove provided in a mouth region of female pipe section. The ring-shaped body is formed of an injection molded elastomeric material which is joined to a series of arcuate gripping segments which have teeth on an inner surface thereof which are designed to engage an outer surface of a mating male pipe section to restrain movement of the male pipe after assembly of a pipe joint. The gripping segments are separated by a gap which is open prior to assembly, but which closes during assembly. Each of the segments also has a positive stop feature to prevent over travel of the male pipe section relative to the female pipe section.

11 Claims, 12 Drawing Sheets

(56) References Cited

U.S. PATENT DOCUMENTS

| | | | |
|---|---|---|---|
| 6,106,029 A | 8/2000 | DeMore et al. | |
| 7,125,054 B2 * | 10/2006 | Jones | F16L 21/04 |
| | | | 285/337 |
| 7,328,493 B2 * | 2/2008 | Jones | F16L 37/0925 |
| | | | 285/374 |
| 7,410,174 B2 | 8/2008 | Jones et al. | |
| 8,235,427 B2 * | 8/2012 | Jones | F16L 37/0842 |
| | | | 285/339 |
| 9,400,071 B1 | 7/2016 | Copeland | |
| 2005/0046189 A1 * | 3/2005 | Corbett, Jr. | F16L 37/0925 |
| | | | 285/374 |
| 2008/0284166 A1 | 11/2008 | Darce et al. | |
| 2018/0328522 A1 | 11/2018 | Jones | |
| 2019/0331274 A1 | 10/2019 | Quesada | |

\* cited by examiner

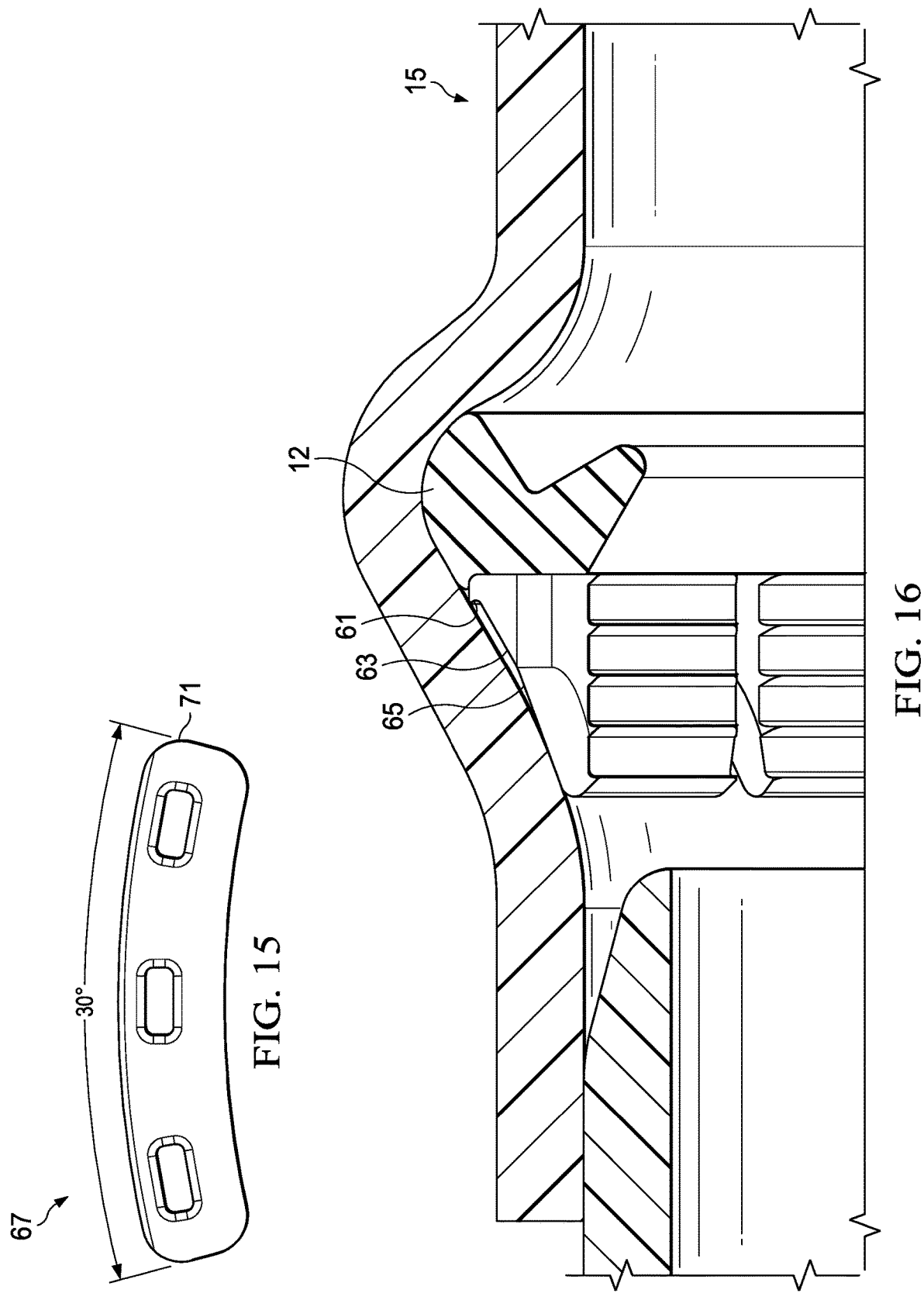

SEALING AND RESTRAINING GASKET FOR USE IN PLASTIC PIPELINES

CROSS REFERENCE TO RELATED APPLICATIONS

The present application claims priority to U.S. Provisional Patent Application Ser. No. 62/664,668 filed Apr. 30, 2018, by the same inventor and with the same title.

BACKGROUND OF THE INVENTION

Field of the Invention

The present invention relates generally to joining and sealing systems for plastic pipe joints and, particularly, for pipe joints formed of molecularly oriented plastic pipe which incorporate u restraint feature to assist in maintaining the integrity of the joint.

Description of the Prior Art

Pipes formed from thermoplastic materials including polyolefins such as polyethylene, polypropylene and PVC are used in a variety of industries. For example, such pipes are commonly used in municipal water and sewer applications. In forming a joint between sections of pipe, the spigot or male pipe end is inserted within the female or socket pipe end. The actual manufacture of the mating sections of plastic pipe typically involves the reforming of the end of the pipe by reheating and shaping to some desired profile to provide a means of mating with the opposing end of the next pipe. The art of forming sockets (also called bells) on plastics pipes is well established, and there are numerous processes and methods in the literature. An annular, elastomeric ring or gasket is typically seated within a groove or "raceway" formed in the socket end of the thermoplastic pipe to assist in forming a sealed pipe joint between adjoining sections of pipe. As the spigot is inserted within the socket, the gasket provides the major seal capacity for the joint.

Various types of sealing technologies have been employed to assure the sealing integrity of the pipe joint. It is important that the sealing gasket not be dislodged during the joint make up and that the gasket not become twisted or otherwise compromised in field applications. It is also important that the gasket not extrude out of the pipe groove under various pressure conditions. Prior art pipe gasket sealing systems are known in which a homogeneous rubber gasket was generally deformable, allowing it to be flexed or bent by hand, accepting, inverse curvature, and inserted within a mating internal raceway formed in the female, belled pipe end. The raceway in the female pipe bell end was pre-formed, as by using a collapsible mandrel belling tool, at the pipe manufacturing facility. One prior art attempt to insure the integrity of such pipe joints involved the use of a pipe gasket having a first distinct body region formed of an elastically yieldable sealing material, such as rubber, bonded to a second distinct body region formed of a more rigid material, such as a rigid plastic. The intent was that the rigid body region of the gasket would assist in holding the gasket in place within the pipe groove. Other approaches to the problem included the use of a homogeneous rubber ring for the gasket body, with a stiffening band which was inserted into a mating groove provided on the internal diameter of the rubber ring, or an internal reinforcing metal band or ring within the rubber gasket body.

In addition to the above considerations which dealt primarily with ensuring the sealing function of the gasketed pipe joint, it was also often found to be desirable to provide some type of "restrained joint" for the pipe joining system. One of the most common prior art devices for forming a "restrained" sealed joint in straight runs of pipe is known in the industry as the "mechanical joint" or "MJ". In the case of ductile iron pipe systems, or hybrid iron and plastic systems, a bell end of an iron pipe section has a cast-on flanged portion on the pipe exterior. The spigot end of a second iron pipe is fitted with a slidable gland fitting and a gasket. The gland fitting has a plurality of apertures for receiving standard bolts. The joint s formed when the spigot is axially inserted into the bell, and the gland fitting and the flanged portion are bolted together, causing the lip of the gland fitting to compress the gasket thus sealing the two pipe pieces.

While the "internal" gasket used in the traditional MJ design for ductile iron pipe served to seal the joint, the gasket itself did not feature a cooperating "restraint" feature in order to assure the greater integrity of the joint of pipe. Instead, the MJ restraint system utilized some version of the described cumbersome external mechanical restraint system made up of die flange, bolts, screws, etc., as discussed above.

Because of the disadvantages associated with the MJ type external restraint system, a number of companies in the industry have worked to develop various forms of restrained joint products for pipelines of the type under consideration, including "push-on" type joints. The following references are merely meant to be illustrative of the general state of the art:

U.S. Pat. No. 7,284,310, issued Oct. 23, 2007, to Jones et al., assigned to the assignee of the present invention, shows an apparatus for both sealing and restraining plastic pipe joints in which the restraining and sealing mechanism includes a circumferential housing and a companion sealing ring which are received within a mating groove provided in the belled end of a female plastic pipe. The circumferential housing has an interior region which contains a gripping ring insert. The sealing ring and housing are integrally located within a belled pipe end during belling operations.

U.S. Pat. No. 8,235,427, issued Aug. 7, 2012, to Jones et al., also assigned to the assignee of the present invention, describes a sealing and restraint system for use with an as-cast ductile iron fitting. A ring-shaped body is installed within a mating groove provided in a mouth region of the as-cast fitting after the fitting has been cast at the manufacturing plant. The ring-shaped body is formed of an injection molded elastomeric material and carries a series of gripping segments which have teeth on an inner surface thereof which are designed to engage an outer surface of a mating male pipe. The teeth are oriented to allow movement of the male pipe in a first direction relative to an end opening of the fitting during assembly, but to resist movement in a opposite direction after the fitting joint has been assembled.

U.S. Pat. No. 9,400,071, issued Jul. 26, 2016, to Copeland, shows a gasket for preventing separation of interconnected pipes including a compressible body having a plurality of multi-sectioned metal segments partially embedded therein. The multi-sectioned metal segments are arranged in groups of two or more or as a continuous ring of segments. The presence of the multi-sectioned or articulating anti-slip segments arranged in groups is said to increase the resultant segment density on large diameter pipes.

U.S. Pat. No. 9,400,072, issued Jul. 26, 2016, to Lopez-Chaves, shows a pipe seal for sealing the joint of a first and second plastic pipe including a carrier member and a sealing member attached to the carrier member. The carrier member has at least one retaining insert with an inner grip portion for gripping the second pipe and an outer grip portion for gripping the first pipe.

The above discussion has described industry efforts to address problems of sealing integrity as well as joint restraint in ductile iron and plastic pipe systems or "hybrid" systems containing components of both iron and plastic. In general the prior art attempts at sealing and restraining plastic pipe have been directed toward traditional (normal) polyvinylchloride (PVC) pipe materials. However, in recent years, pipe systems employing molecularly oriented pipe and particularly the so called "PVC-O" pipe have become increasingly popular. The designation "PVC-O" stands for polyvinylchloride oriented, sometimes referred to simply as molecularly oriented pipe, or "MOP." It is well established in the literature that molecular orientation of plastics can provide enhanced mechanical properties for plastic pipe of the type under consideration.

Orientation is achieved by drawing or stretching the material under appropriate conditions of temperature, such that a strain (i.e. deviation from the originally formed dimensions) is induced in the plastics material to cause alignment of the molecules, and thereafter cooling the material while drawn to lock in that strain. A number of methods have been proposed whereby this principle is applied to plastic pipes, in particular in order to enhance their strength under internal pressure by circumferential and/or axial forces, or by external forces acting on the pipeline.

For example, U.S. Pat. No. 4,428,900, shows a pipe of oriented thermoplastic polymeric material having an integral socket which is manufactured by expanding a tubular blank. The tubular blank is heated by circulation of hot water to a temperature at which deformation will induce orientation of the polymer molecules. The blank is then expanded radially outward against a mold by application of internal pressure.

U.S. Pat. No. 5,449,487, shows an apparatus and method for orienting plastic pipe. A heated pipe is oriented radially by means of a conically widening mandrel which is located downstream of the plastic extruder.

The above examples are intended merely to be illustrative of the general state of the art in the manufacture of molecularly oriented pipe.

In the case of the more exotic PVC-O pipelines, the problem of providing a "restrained" joint, as well as a properly sealed joint, is exacerbated where the overall object is to ensure that the spigot or male pipe end and the female or socket end do not separate due to internal or external forces, such as hydraulic forces that exist inside the pipeline, or external forces, such as bends in the direction of the pipeline, earthquakes or ground movement, and the like. The problem is exacerbated in the case of PVC-O pipe joints in that the prevalent socket end is often provided with an "Anger™ Raceway" for receiving the sealing gasket. Since an advantage of PVC-O pipe is that it can be thinner with the same type strength as traditional PVC pipe, the Anger™ Raceway has a different geometry than the traditional socketed grooves provided in the more traditional "Rieber™" gasket sealing systems for traditional PVC pipe. The so-called triangular or "30/60 degree" geometry of the Anger™ raceway has proved to be a more difficult problem from the standpoint of providing a securely sealed joint than the traditional PVC pipe joint.

Thus, in spite of the advances in the art which have been described with respect to sealing and restraining plastic pipe joints, a need continues to exist for improved techniques for manufacturing and joining plastic pipe with restrained joints and, particularly molecularly oriental pipe such as PVC-O pipe, which techniques take into account the unique properties of these types of molecularly oriented plastic materials.

A need exists for such pipe joining systems which are cost-effective, easy to manufacture and which are easy to install the field or manufacturing plant and which are dependable in use and operation.

SUMMARY OF THE INVENTION

The present invention has as one object to provide a combination sealing and restraint system for insertion within an annular groove within a mouth region located adjacent an end opening of a female plastic pipe capable of both sealing and restraining the female plastic pipe to a mating mate pipe having an interior surface and an exterior surface. The sealing and restraint system of the invention has particular applicability where the pipe sealing system is a system incorporating components made of molecularly oriented pipe, such as PVC-O pipe systems.

The sealing and restrain system of the invention includes an annular gasket body made of a resilient elastomeric material, the annular gasket body having an inner circumferential region and an outer circumferential region, the annular gasket body being installed within the annular groove provided in the mouth region of the female section of plastic pipe so that the outer circumferential region forms a seal with the mouth region and the inner circumferential region forms a sealing surface for a mating male pipe. A plurality of arcuate rigid gripping segments extend outwardly from the annular gasket body at a predetermined spacing around the circumference of the annular gasket body. The gripping segments are comprised of in inner surface, an outer surface separated by a thickness, and opposing end surfaces, and wherein the inner surface of each segment has at least one row of gripping teeth capable of engaging selected points on the exterior surface of the mating male pipe and apply a gripping force to the exterior surface.

The gripping segments are separated by a predetermined gap when the gasket is in the relaxed state. The size of the gap is selected to balance ease of assembly versus sealing performance when the pipe joint is assembled. The gap closing during assembly so that at least some contact is typically made between the end surfaces of adjacent gripping segments.

Preferably there are six or more gripping segments arranged in circumferential fashion about the resilient elastomeric gasket body. In one particularly preferred form of the invention, there are twelve gripping segments arranged in circumferential fashion about the resilient elastomeric gasket body, each covering a 29.2° arc so that the segments produce approximately 350.4° of contact with the mating male plastic pipe during assembly of the pipe joint.

In the preferred form of the invention, the outer surface of each gripping segment has a sharp circumferential ridge formed thereon adjacent the rear edge thereof, the sharp ridge being positioned so as to contact a 30/60 annular groove provided in the mouth region of the PVC-O female pipe section during assembly of the pipe joint to prevent further sliding of the male pipe relative to the female pipe after initial gripping of the male pipe has occurred during the assembly of the pipe joint. Also, each of the gripping segments can be provided with a side chamfered region joined to a relatively straight region on each of the side surfaces thereof, the side chamfered regions serving to reduce clash between adjacent gripping segments during installation of the male pipe section within the female pipe section to make up the pipe joint. The gripping segments can also be provided with rounded rear edges as well as rounds on the end faces to aid in installation and to avoid a rough insert-to-seal interaction.

A method is also shown for forming a sealed and restrained pipe joint, the method comprising the steps of:

providing a fluid piping system including at least one PVC-O female pipe section having a mouth region adjacent an end opening thereof, the mouth region having a 30/60 annular groove therein, the end opening of the female PVC-O pipe section being sized to receive a mating male plastic pipe section having an interior surface and an exterior surface;

in a post-pipe manufacturing operation, installing a sealing and restraining system within the annular groove provided in the end opening of the female plastic pipe section, the sealing and restraining system having an annular ring-shaped body made at least in part of a resilient elastomeric material, the ring-shaped body having an inner circumferential region and an outer circumferential region, the ring shaped body being installed within the annular groove provided in the mouth region of die female pipe section fitting so that the outer circumferential region forms u seal with the fitting mouth region and the inner circumferential region forms a sealing surface for the mating male pipe section;

wherein a plurality of integrally formed gripping segments are provided for applying a gripping force to a mating male pipe, each having an outer planar surface extend outwardly from the annular gasket body at a predetermined spacing around the circumference of the annular gasket body, the spacing being sufficient to allow the gasket body to be flexed to thereby allow the sealing and restraint system to be installed in the mouth region of the pipe fitting as a post-manufacturing operation;

wherein the gripping segments are each comprised of an inner surface, un outer surface separated by a thickness, and opposing end surfaces, and wherein the inner surface of each segment has at least one row of gripping teeth capable of engaging selected points on the exterior surface of the mating mule pipe and apply a gripping force to the exterior surface; and wherein the gripping segments are separated by a predetermined gap. The size of the gap being selected to balance case of assembly versus sealing performance when the pipe joint is assembled, the gap closing during assembly so that at least some contact is made between the end surfaces of adjacent gripping segments.

The gripping segments used in the method of the invention also preferably include the sharp circumferential ridges which act as a positive stop for the gripping mechanism and the previously described side chamfered regions and rounded rear and end faces.

The method further comprises the steps of thereafter installing a mating male pipe within the end opening of the mouth region of the female plastic pipe section by pushing the male pipe section into the mouth opening of the female pipe section, the sealing and restraint system contacting the external surface of the mating male pipe in order to both seal and restrain the mating male pipe and form a secure joint.

Additional objects, features and advantages will be apparent in the written description which follows.

BRIEF DESCRIPTION OF THE DRAWINGS

FIG. 15 is a view similar to FIG. 9 of the bottom of one of the gripping segments of the version of the invention shown in FIGS. 10 and 11.

FIG. 16 is a side, cross sectional view of a pipe joint showing the gasket of FIGS. 10 and 11 in place just prior to forming the sealed joint.

DETAILED DESCRIPTION OF THE INVENTION

Figure 1:
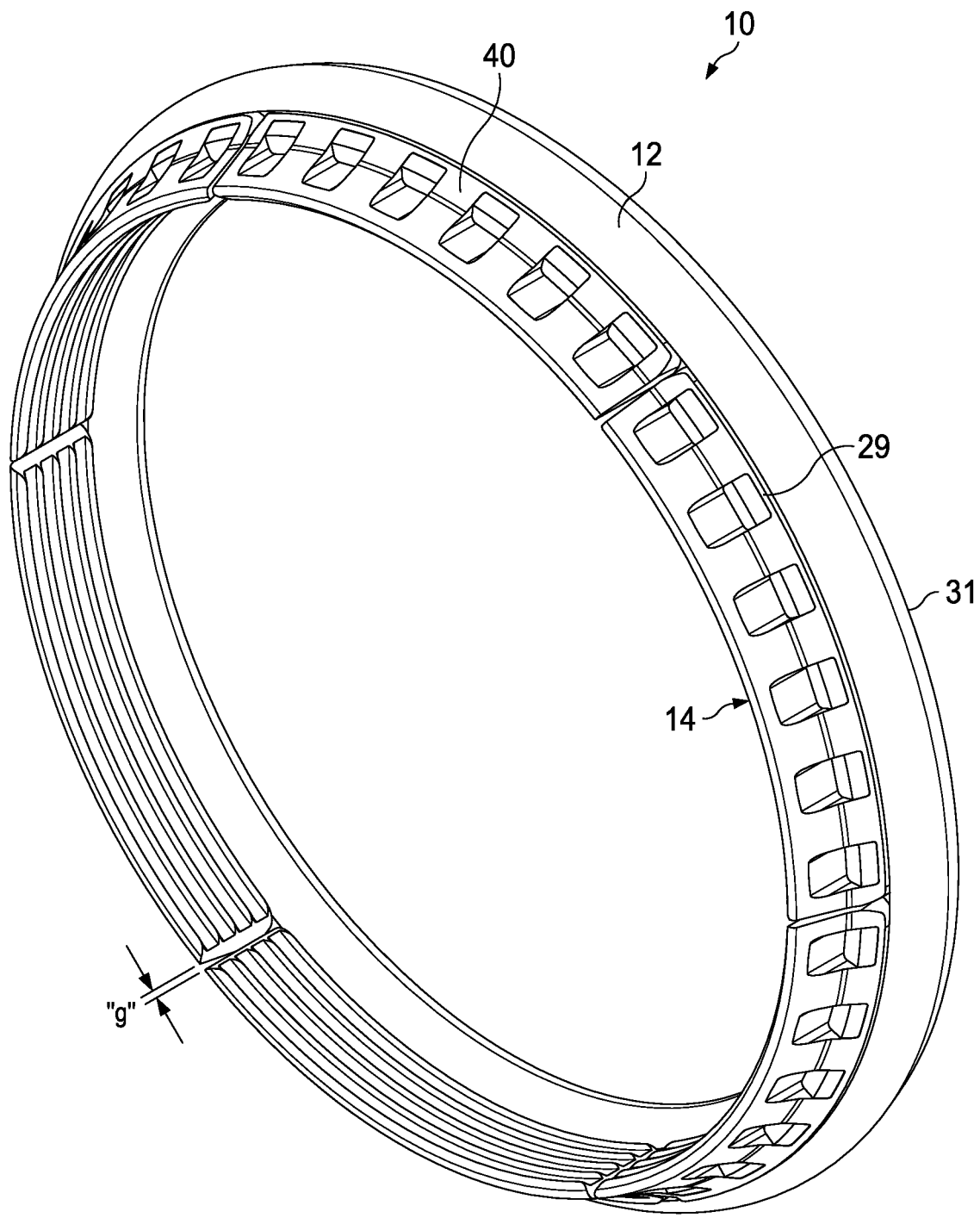
FIG. 1 is a perspective view of one version of the sealing and restraining gasket of the invention in which six gripping segments are joined to the rubber sealing portion of the gasket.

Plastic pipe systems are commonly used at the present time for a multitude of tasks including the conveyance of drinking water, waste water, chemicals, heating and cooling fluids, foodstuffs, ultra pure liquids, slurries, gases, compressed air and vacuum system applications, both for above and below ground applications. Plastic pressure pipe systems have been in use in the United States for potable (drinking) water systems since at least about the 1950s. The types of plastic pipe in commercial use in the world today include, for example, unplasticized polyvinyl chloride (referred to as PVC or PVC-U), acrylonitrile butadiene styrene (ABS), post chlorinated polyvinyl chloride. (CPVC), polypropylene (PP), polyethylene (PE), polyvinylidene fluoride (PVDF) and polybutylene (PB) and more recently the so-called "molecularly oriented plastics."

As has been briefly discussed, the present invention has particular applicability to sealing and restraint systems where this newer form of plastic material is used in the plastic pipe manufacture. These plastic pipe materials, which will be familiar to those skilled in the relevant arts, are referred to as, for example, "PVC Molecularly Oriented Pipe", sometimes called "PVC-O pipe" or simply "MOP" for simplicity. Techniques for manufacturing such pipe materials are known. The end result is a molecularly oriented thermoplastic pipe material which typically exhibits enhanced strength in certain directions due to orienting the molecules in the plastic material in such direction, whereby the tensile strength of the plastic increases and the stretch decreases in such direction. This can provide advantages, for example when applied to tubular articles, where orienting is effected in the radial direction, for instance to increase the pressure resistance of the pipe, or in the longitudinal direction of the pipe, for instance to increase the tensile strength of the pipe, or in both directions (biaxial orientation). In the case of PVC-O pipe systems for municipal water and sewer pipe, the molecular orientation approximately doubles the material strength, so that only about half the wall thickness for the same pipe class is required to be used to meet the applicable specifications. In the discussion which follows, the term "PVC-O" pipe will be taken to mean molecularly oriented pipe generally of the type used in the water and sewer industries.

As has also been briefly discussed, in the case of either the more ordinary PVC pipeline, or the more exotic PVC-O pipeline, or other molecularly oriented pipeline, it is often desirable to provide a "restrained joint" to insure that the spigot or male pipe end and the female or socket end do not separate due to internal or external forces, such u hydraulic forces mat exist inside the pipeline, or external forces, such as bends in the direction of the pipeline, earthquakes or ground movement, and the like.

Problems have existed in the past in providing PVC-O pipe with effective and workable joint restrain systems, due in part to the unique characteristics of the molecularly oriented pipe material itself. The problem is exacerbated in the case of PVC-O pipe joints in that the prevalent socket end is often provided with an "Anger Raceway™" for receiving the sealing gasket. In other words, PVC-O pipe, unlike ordinary PVC pipe, is typically provided with what is called a "30/60" internal circumferential groove or raceway, sometimes referred to as the "Anger Groove™" for receiving the sealing gasket to form u pipe joint. However, the Anger Groove™ provides a very limited space for any type of joint restraint. The Anger™ pipe manufacturing method is described, for example, in U.S. Pat. No. 4,379,115, issued Apr. 5, 1983 to Seach et al., and in various other references. Since an advantage of PVC-O pipe is that it can be thinner with the same type strength as traditional PVC pipe, the Anger Raceway™ consequently has a different geometry than the traditional socketed grooves provided in the more traditional "Rieber" gasket sealing systems for traditional PVC pipe. The fact that this geometry has proved to be a more difficult problem from the standpoint of providing a securely sealed joint than the traditional PVC pipe joint is the primary problem to be addressed by the present invention.

The present invention is therefore directed to improvements in joints in plastic pipe, and particularly molecularly oriented pipe, such as PVC-O pipe by providing a more efficient and effective restraint system for such pipes. As stated above, the restraint systems of the invention find particularly applicability to molecularly oriented pipe manufactured according to the Anger™ method, having the so called "triangular" or "30/60" internal circumferential groove.

The claimed invention addresses the problem of how to provide a securely sealed push-on joint, for example, in PVC-O pipe having an Anger™ raceway, that can seal under a variety of pressures while still being able to be installed by hand (unlike the "Rieber" process commonly used in the industry which is installed during the manufacture of the plastic pipe itself). The sealed and restrained gasket of the invention may also be used with other pipe materials in some cases, where the materials have similar characteristics to PVC-O, such as, for example, PVC-U. The restraint mechanism is installed together with the sealing portion of the gasket in the socket groove or raceway of the female belled pipe end.

Prior to discussing the preferred sealing and restraint system of the invention, two of the existing methods for manufacturing PVC-O pipe will be briefly discussed. Both processes start by extruding a length of PVC-U pipe at a reduced diameter and increased wall thickness, followed by heating the pipe to the glassy transition temperature and expanding it to the desired diameter and wall thickness.

The following is an example of a "batch process" for producing PVC-O pipe:
  Extrude a pipe at 50% OD and 200% thickness of desired product. Cut into 7.1 m sections.
  Insert length of starting stock into a closed mold. This mold is a jacketed cylinder approximately 7.6 meters (25 ft) long including bell-forming segment that is bolted on its end. Each end of the starting stock is "pinched down" and held in place.
  Heat the pipe near its glassy transition temperature. Use internal pressure to expand the pipe until it comes in contact with the mold.
  Cool the mold. After the pipe hardens again it will undergo thermal contraction so it detaches from the mold surface.
  Remove expanded pie from the mold.
  The pipe is transported to a cutting station where each of the "pinched down" ends is cut off to form the final 6.1 meter (20 ft) laying length.

The following is an example of a "continuous process" for producing PVC-O pipe:
  Extrude a pipe, or starting stock, 50% of the desired OD and having twice the wall thickness of the desired finished product.
  The starting stock goes through a "conditioning tank" where it is uniformly heated to a desired temperature.
  The starting stock is pulled through an "expansion zone" by a second haul-off where further heat brings the stock above the Tg of PVC. Desired dimensions are attained in the expansion zone.
  The oriented pipe is cooled in a spray tank.
  The oriented pipe is cut to length using a special rotary saw.
  The oriented pipe is transported to a belling machine and the bell socket is formed.

Belling and gasket options for commercially available PVC-O pipe may vary, but a common approach is to form a bell or socket end with an internal circumferential groove for receiving an annular sealing gasket where the circumferential groove is an Anger™ "30/60" groove or raceway.

In the following discussion, the shorthand "30/60" will be taken to mean the Anger™ groove or manufacturing process.

Figure 6:
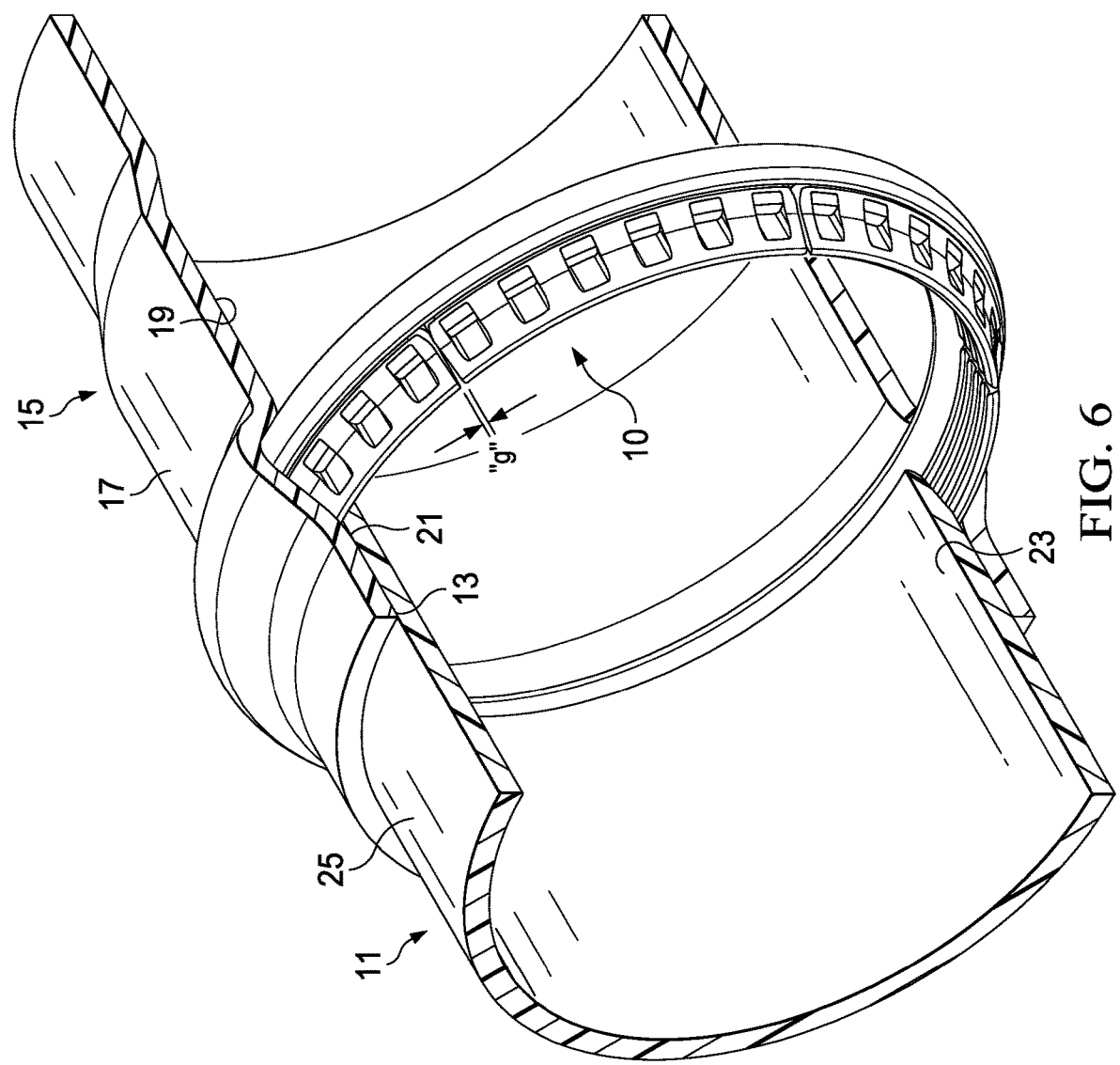
FIG. 6 is an assembly view of the gasket of FIG. 1 in place in a plastic pipe joint, where the mate and female pipe members are partly broken away for ease of illustration.

Examples will now be presented of sealing and restraining joints of the invention which can be used in joining and sealing plastic pipe and which can be particularly advantageously used with the previously described "30/60" molecularly oriented pipe. FIG. 1 of the drawings shows a preferred version of the sealing and restrained gasket of the invention, designated generally as 10. FIG. 6 of the drawings shows the gasket 10 in place in a mouth region of a section of PVC-O pipe.

Thus, with reference to FIG. 6, there is shown, in quarter sectional fashion, a male or spigot pipe end 11 of one section of PVC-O pipe about to be inserted into the mouth or end opening 13 of a socket or bell pipe end 15 of a second, female mating section of PVC-O pipe of the type under consideration. The female pipe section 15 has n exterior surface 17, an interior surface 19 and having an interior circumferential recess or groove 21, sometimes referred to as a "raceway" formed in the belled pipe end adjacent the mouth opening on the interior surface thereof. The circumferential groove or raceway 21 is formed during the manufacture of the plastic pipe. Thereafter, a sealing and restraining gasket 10 of the invention is installed within the raceway.

The mating male section of plastic pipe or spigot 11 has an interior surface 23 and exterior surface 25. In the view shown in FIG. 6, the male pipe section 11 is beginning the insertion step within the mouth opening of the female pipe section 15 to form a sealed pipe joint.

The sealing and restraint gasket 10 is shown in perspective in FIG. 1 of the drawings. The sealing and restraint element 10 is comprised of an inner ring-shaped elastomeric body 12 joined to a series of hardened arcuate gripping segments (such is segment 14 in FIG. 1). The ring-shaped elastomeric body 12 has an inner circumferential region 29 and an outer circumferential region 31, the outer circumferential region being arranged to form a seal with the interior surface of the belled end of the female pipe section (sec FIG. 7) while the inner circumferential region forms a sealing surface for the exterior surface of the mating male pipe section. The particular sealing element shown has a downwardly extending sealing lip (33 in FIG. 7) which is contacted by the exterior surface of the mating male plastic pipe during the assembly of a pipe joint to form a compression seal.

The elastomeric portion 12 of the sealing and restraint system of the invention provides the primary sealing capacity for the pipe joint. This portion of the gasket is made of a material which accepts inverse curvature to allow easy installation in a pre-formed female pipe bell raceway by hand. It can be installed by the pipe manufacturer, or afterward in a field assembly. The main rubber portion of the gasket can be, for example, styrene butadiene rubber (SBR), ethylene propylene diene rubber (EPDM), acrylonitrile-butadiene rubber (NBR), nitrile rubber, etc., and the manufacture of such sealing bodies is well known by those skilled in the relevant arts. The Durometer of the rubber used will vary according to the end application but will generally have a Shore A hardness in the range from about 40 to 65.

The lip seal region 33 of the elastomeric body is joined to the outer circumferential region 31 (FIG. 7) by a V-shaped recess 34. The outer convex region making up the outer circumferential region 31 continues to a downwardly sloping shape to terminate in a nose region 36 of the gasket. The arcuate gripping segments 14 extend generally perpendicularly outward from the nose region 36 of the annular gasket body 12 at a predetermined spacing around the circumference of the annular gasket body. By "extending generally perpendicularly outward" is meant that the segments extend generally along an axis generally parallel with a centerline or central axis (generally at 38 in FIG. 7) of the pipe joint. In the example shown in FIGS. 1-9, there are six evenly spaced gripping segments (such as the segment 40 in FIG. 1).

The gripping segments 14 (shown in greater detail in FIGS. 3 and 4) are typically formed of a metal such as iron or steel, although the segments might in some cases be formed of a hard plastic or other semi-rigid materials where the mating male pipe to be gripped is formed of, for example, PVC. The number of gripping segments will vary depending upon the diameter of the sealing and gripping assembly. For example, in the case where the annular gasket body 12 has an eight inch diameter, six separate gripping segments 14 are shown extend outwardly around the circumference of the gasket body. It will be appreciated from FIG. 1 that the "gap" between adjacent segments is quite small in such case, with the gripping segments nearly touching on the side surfaces and with the segments forming a near 360° contact surface with the mating male pipe section when the joint is assembled. As will be described further, the width of the gaps may vary. The gaps "g" between the metallic gripping segments 14 provide some degree of flexibility for the assembly, thereby facilitating its installation within the mouth region of the female pipe section.

Figure 4:
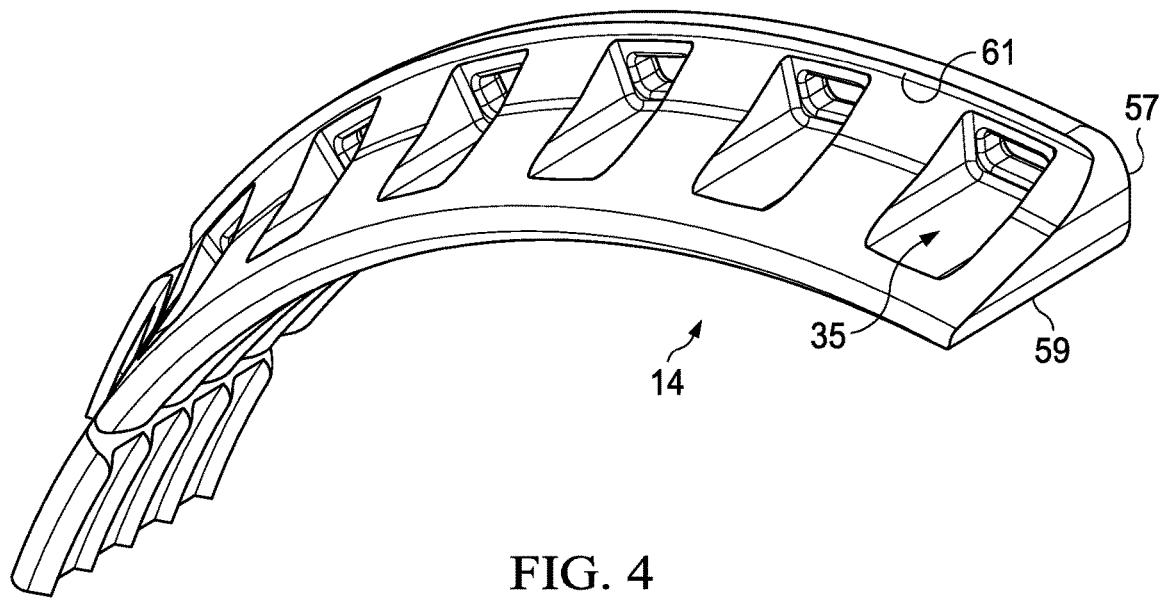
FIG. 4 is an isolated view of the gripping segments of FIG. 3.
Figure 5:
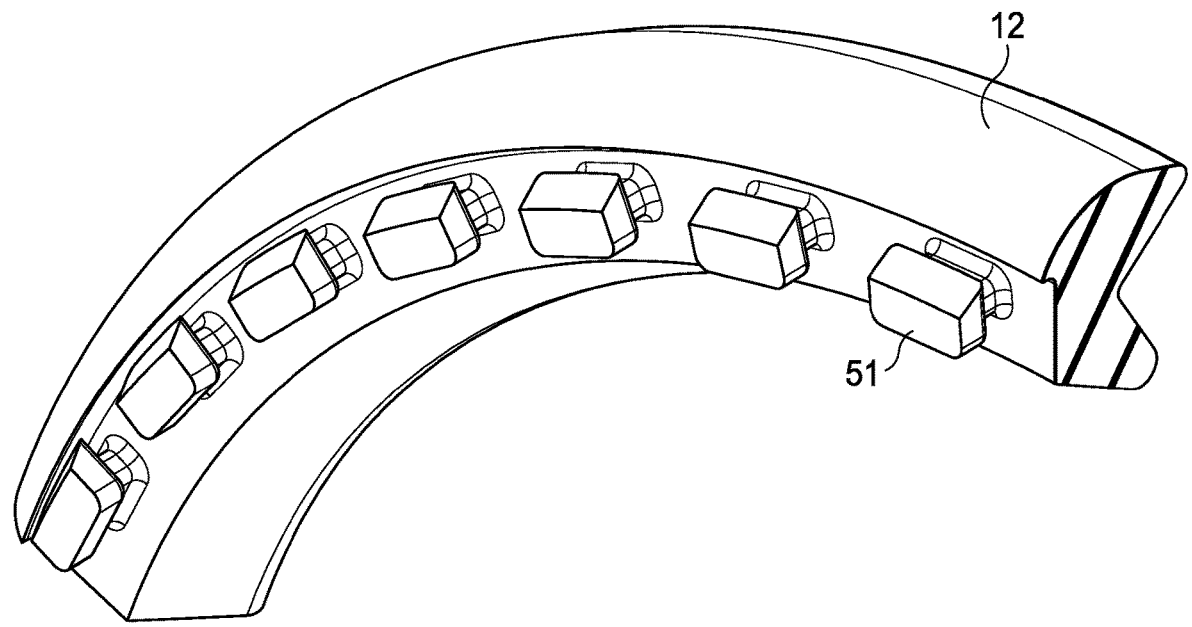
FIG. 5 is an isolated view of a portion of the rubber body portion of the gasket of FIG. 1, partly in section.

FIG. 4 shows one of the gripping segments 14 in perspective view. As will be appreciated from FIG. 4, the arcuate metal body 14 has a plurality of window openings 35 communicating a front and rear edge 37, 39, thereof. At will be explained further, the window openings 35 constitute lock regions which cooperate with mating portions of the resilient elastomeric material of the gasket body, whereby in some versions of the invention, the gripping segments are mechanically secured to the gasket body during manufacture, as by injection molding rubber from the gasket, body through the window openings.

Figure 3:
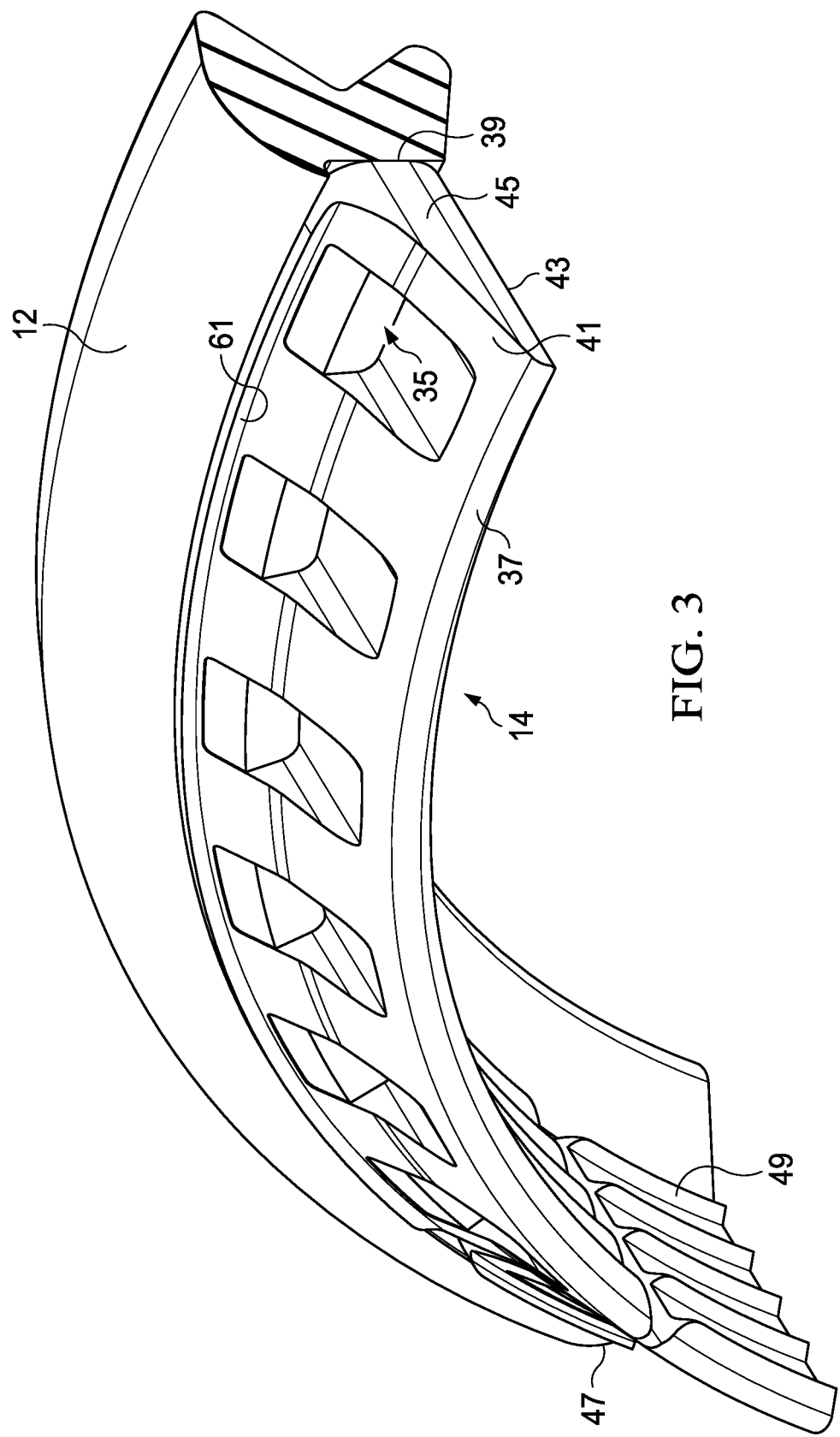
FIG. 3 is a view of a portion of two gripping segments of the gasket of FIG. 1, one of the segments being shown in section.

Each segment also has an inner surface 41 and an outer surface 43 which are separated by a thickness which tapers from the front edge 37 toward the rear edge 39, giving the segment a near triangle-shaped cross section. Each segment also has opposing end surfaces 45, 47. As shown in FIG. 3, each segment's inner surface has at least one row of gripping teeth 49 capable of engaging selected points on the exterior surface of the mating male pipe and apply a gripping force to the exterior surface thereof. Preferably, there are multiple rows of gripping teeth.

Figure 7:
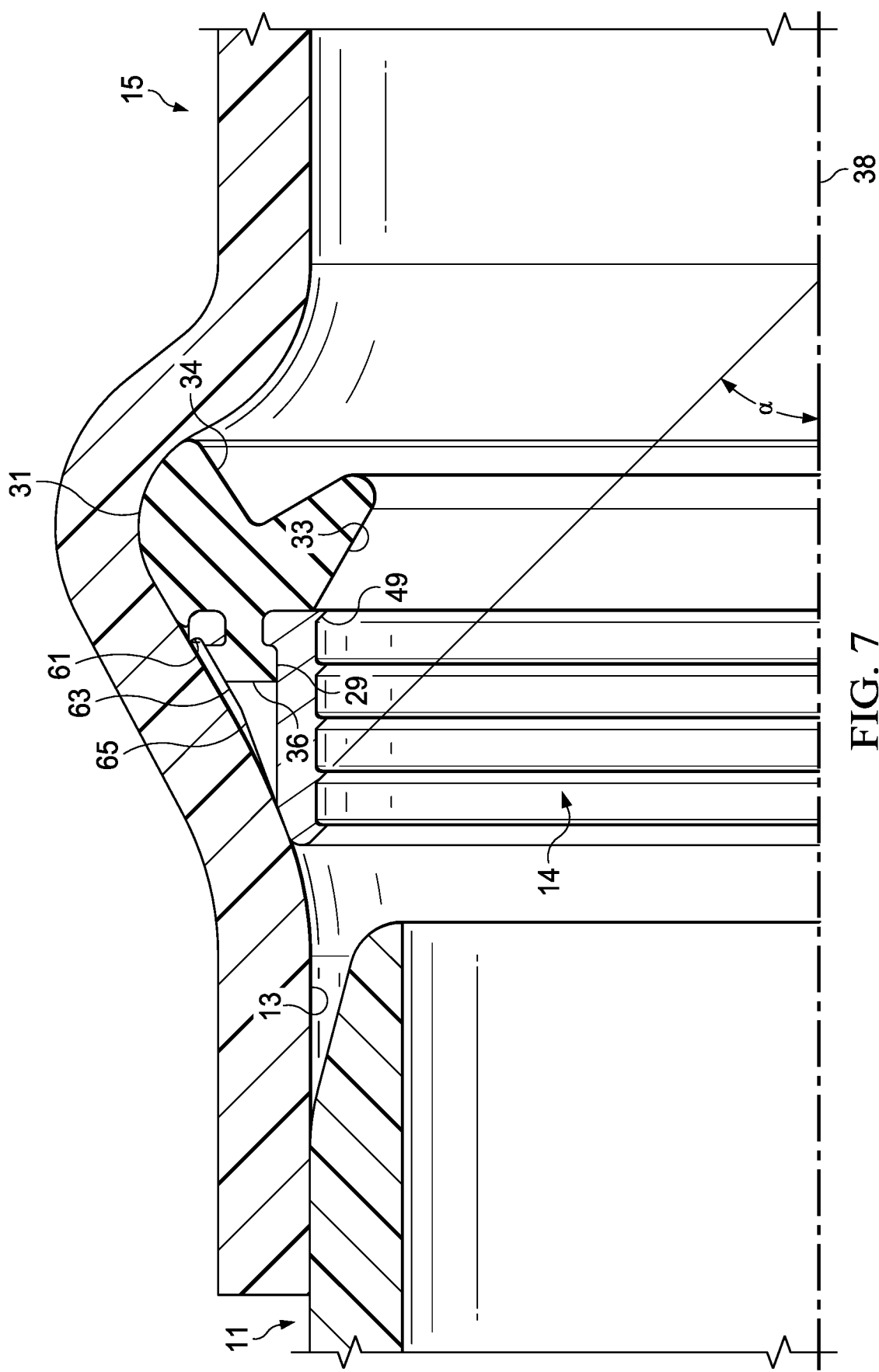
FIG. 7 is a side, cross sectional view of a section of the pipe joint of FIG. 6 showing the sealing and restraining gasket in cross section.

In the version of the device illustrated in FIG. 3, there are five rows of teeth 49 on the inner circumferential surface of the gripping segment. As illustrated in FIG. 7, the teeth are formed on an acute angle "α" with respect to the pipe horizontal axis (illustrated as 38 in FIG. 7) of the mouth opening 13 once assembled. The shape and inclined angle of the teeth allow a mating male pipe end to be received within the end opening 13 of the fitting 39 and move in a direction from left to right as viewed in FIG. 7. However, the shape and inclined angle of the teeth 49 resist opposite relative movement of the mating male pipe 11 and thereby exert a restraining force on the mating male pipe 11 once the male pipe has be fully inserted into the female pipe opening.

As briefly mentioned, the gripping segments 14 may be integrally formed as a part of the leading nose region 36 of the annular gasket body 12 during manufacture of the gasket body. For example, the gasket body may be injection molded with the gripping segments being integrally locked into the gasket body during the injection molding operation with the rubber flowing into the window openings (35 in FIG. 3). In some cases, the elastomeric rubber body 12 may have flexible "peg-like" extensions 51 formed thereon which can be snap-fit within the window openings of the gripping segments (sec FIG. 5). The gripping segments may also have the window openings omitted and may be chemically bonded to the elastomeric rubber portion of the gasket body 12. Alternatively, it may be possible to glue or otherwise adhere the gripping segments to the elastomeric gasket body in some circumstances so that the segments are held in the position shown in FIG. 3.

In some circumstances, the gripping segments 14 used in the practice of the invention may be coated with a low-coefficient of friction synthetic coating. For example, a top coat may be applied to the gripping segments which is a synthetic polymeric coating. Example synthetic polymer coatings are, for example, thermoplastic polymeric materials such as those selected from such materials as polyvinyl chloride, fluoroplastic polymers, nylon, and the like, depending upon the end application of the pipe joint. One such class of coating are the fluoroplastic polymers, sometimes referred to as "fluoroelastomers." These materials are a class of paraffinic polymers that have some or all of the hydrogen replaced by fluorine. They include polytetrafluoroethylene, fluorinated ethylene propylene copolymer, perfluoroalkoxy resin, polychloro-trifluoroethylene copolymer, ethylene-tetra-fluoroethylene copolymer, polyvinylidene fluoride and polyvinyl fluoride. Fluoroplastics have a low coefficient of friction, especially the perfluorinated resins, giving them unique nonadhesive and self-lubricating surface qualities.

Figure 8:
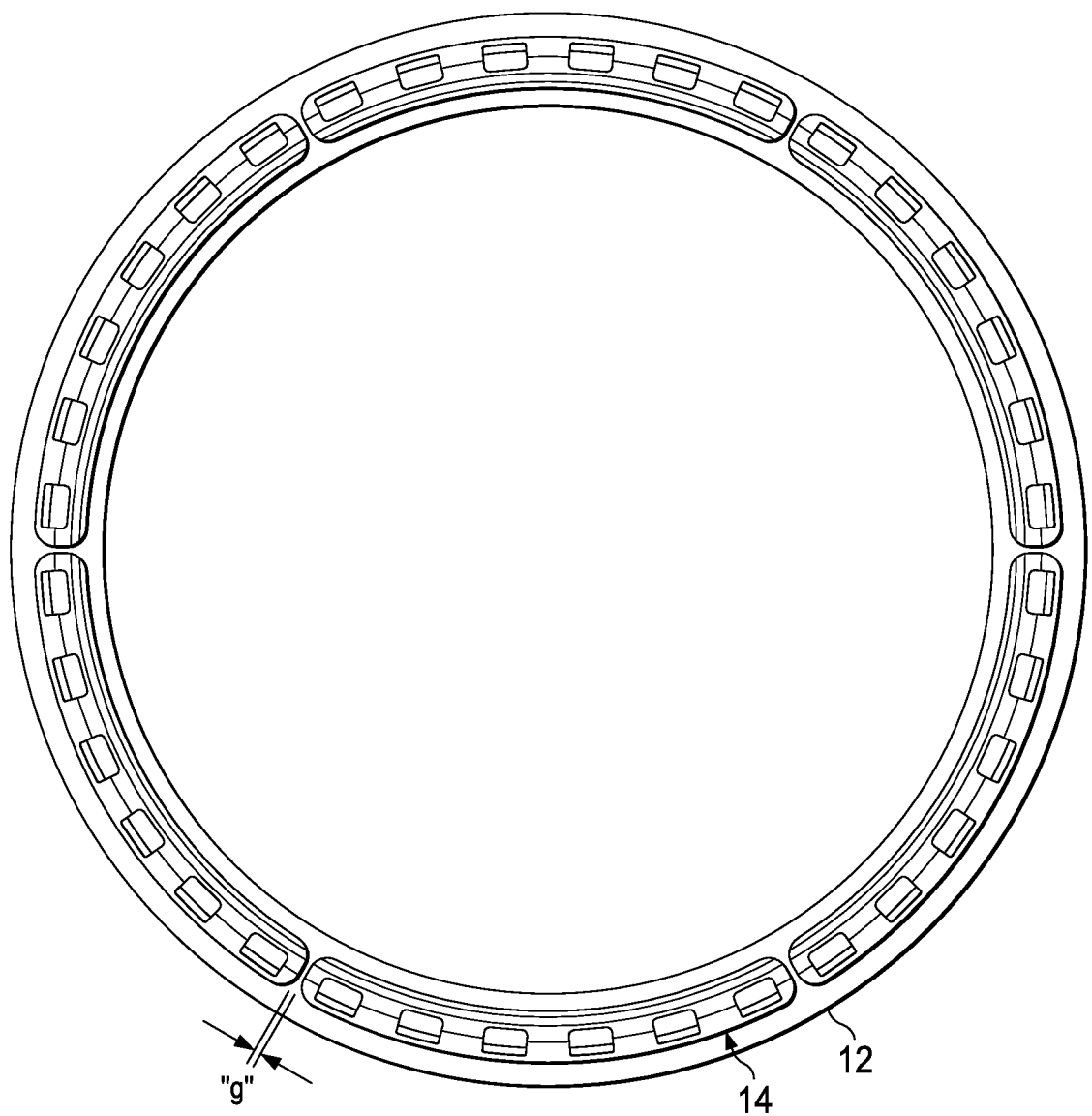
FIG. 8 is a top view of the sealing and restraining gasket of FIG. 1.
Figure 9:
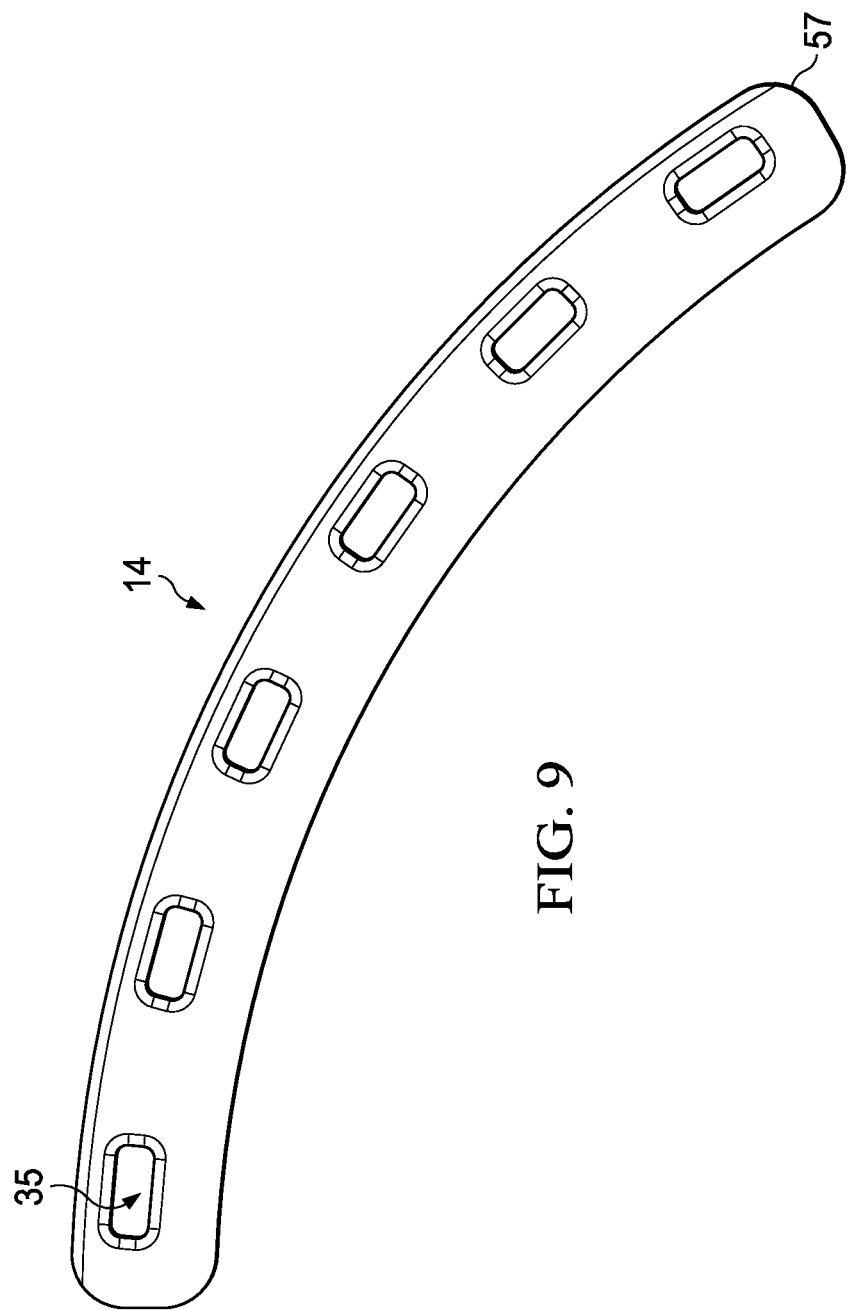
FIG. 9 is a bottom, isolated view of one of the gripping segments of the gasket of FIG. 1.

With reference now to FIGS. 1, 2, 2A and 6-9, it will be appreciated that the "gap" between adjacent metal segments is very small with the adjacent segments even touching or near touching (see FIG. 8). The "gap" which separates the adjacent segments is, in tact, a predetermined distance, the size of the gap being selected to balance ease of assembly of the pipe joint versus sealing performance when the pipe joint is assembled. In any event, the gap will generally close during assembly so that at least some contact is made between the end surfaces of adjacent gripping segments. In the assembly view of FIG. 6, the gaps "g" between the adjacent segments open as the gripping segments separate to allow the male spigot pipe end to enter the mouth region of the female pipe section. In the fully engaged position, the gaps close again as the gripping segments sink their teeth into the male, spigot pipe section. When the gaps close, the tightening of the grips stops to avoid damaging the spigot.

Figures 2, 2A:
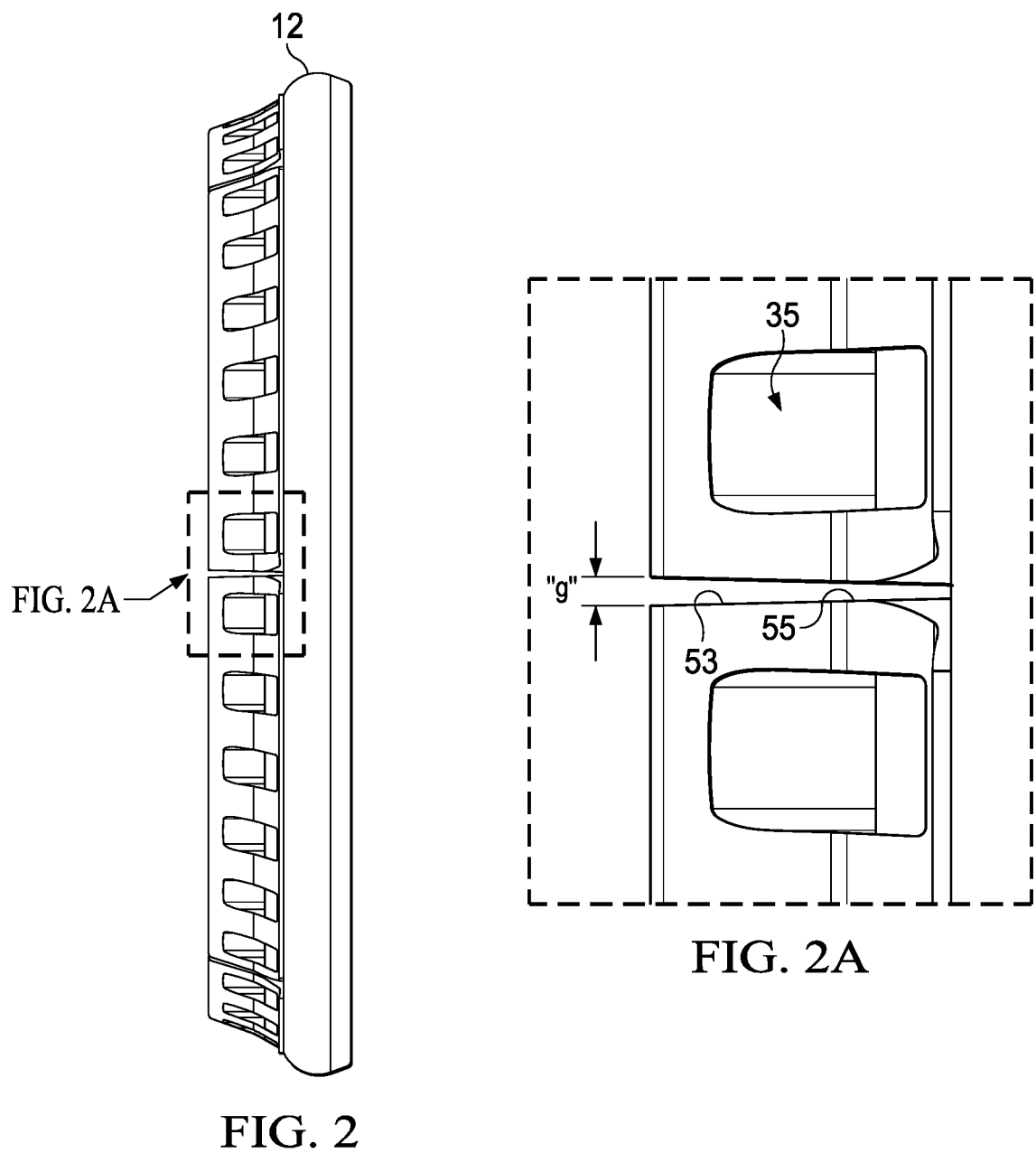
FIG. 2 is a side view of the sealing and restraining gasket of FIG. 1.
FIG. 2A is a close-up view of the region indicated as "2A" in FIG. 2.

With reference primarily to FIG. 2A, the side surfaces of the adjacent gripping elements may be provided with, for example, a 15° side chamfer region 53 so that the inside end regions 55 make contact during assembly to produce a positive grip stop, while the chamfer region serves to reduce segment clash during installation. With reference to FIG. 4, the gripping segments are also preferably given rounded edges in the end regions shown as 57, 59, in order to avoid rough insert-seal interaction and problems and also to ease hand assembly.

FIGS. 3, 4 and 7 illustrate another important feature of the invention. The gripping segments in each case are provided with a sharp arcuate ridge or edge region, designated generally as 61. In the 30/60 Anger™ raceway, there is no natural "stop" present to prevent the male and female pipes from continuing to slip relative to one another after the initial gripping of the spigot. As perhaps best seen in FIG. 7, the sharp edge region 61, which runs along the upper circumferential region of the segment, acts to bite into the female pipe wall and to prevent further sliding after gripping the spigot.

The sharp edge region 61 (FIG. 7) is joined to a sloping outer surface region 63 of the gripping segment which makes an approximate 30° angle to align with a typical Anger™ raceway profile. This sloping region 63 terminates in an approximate 20° angle sloping outer surface region 65 to promote a wedging effect and grip engagement.

As has been mentioned, the number of the gripping segments 14 and the size of the gap between adjacent segments may vary depending upon the pipe diameter and other factors, including the required performance characteristics and the relative ease of assembly of the pipe joint. Thus, for example, with the 8 inch diameter gasket shown in FIGS. 1-9, there are six gripping segments equidistantly spaced about the nose region of the gasket. FIGS. 10-16 show another version of the sealing and restraint system of the invention in which there are twelve gripping segments present. Each segment 67 provides about 29.2° of coverage so that the twelve segments together provide approximately 350.4° of contact with the male spigot pipe end when fully engaged. The sharp edge region of each gripping segment (69 in FIGS. 11 and 12-14) is again present, as are the rounded corner regions 71, 73. The 15° side chamfer 75 is also present.

Figure 10:
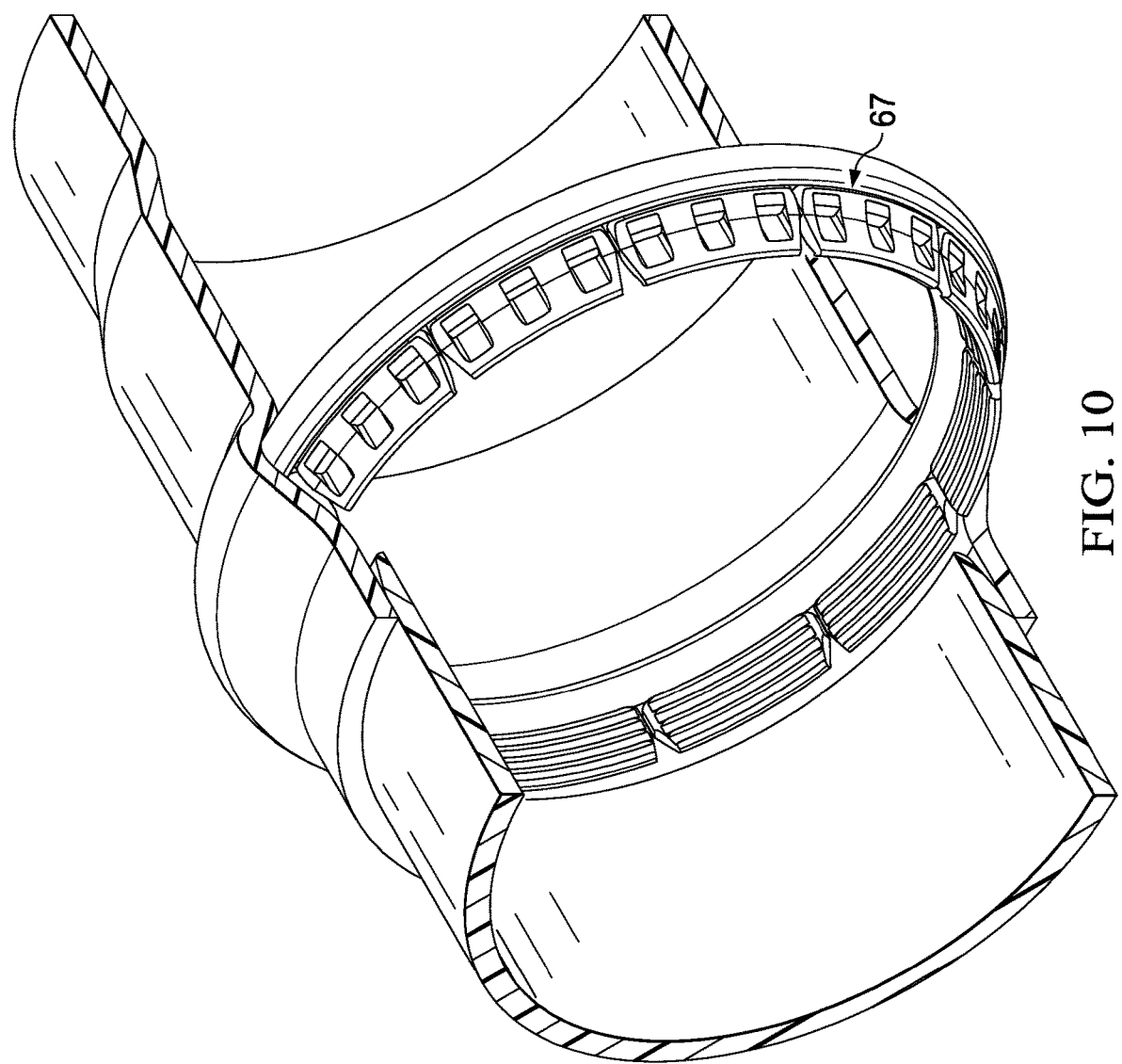
FIG. 10 is an assembly view similar to FIG. 6 of a plastic pipe joint using the sealing and restraining system of the invention, but showing an alternate form of the gasket using twelve gripping segments, instead of six.
Figure 11:
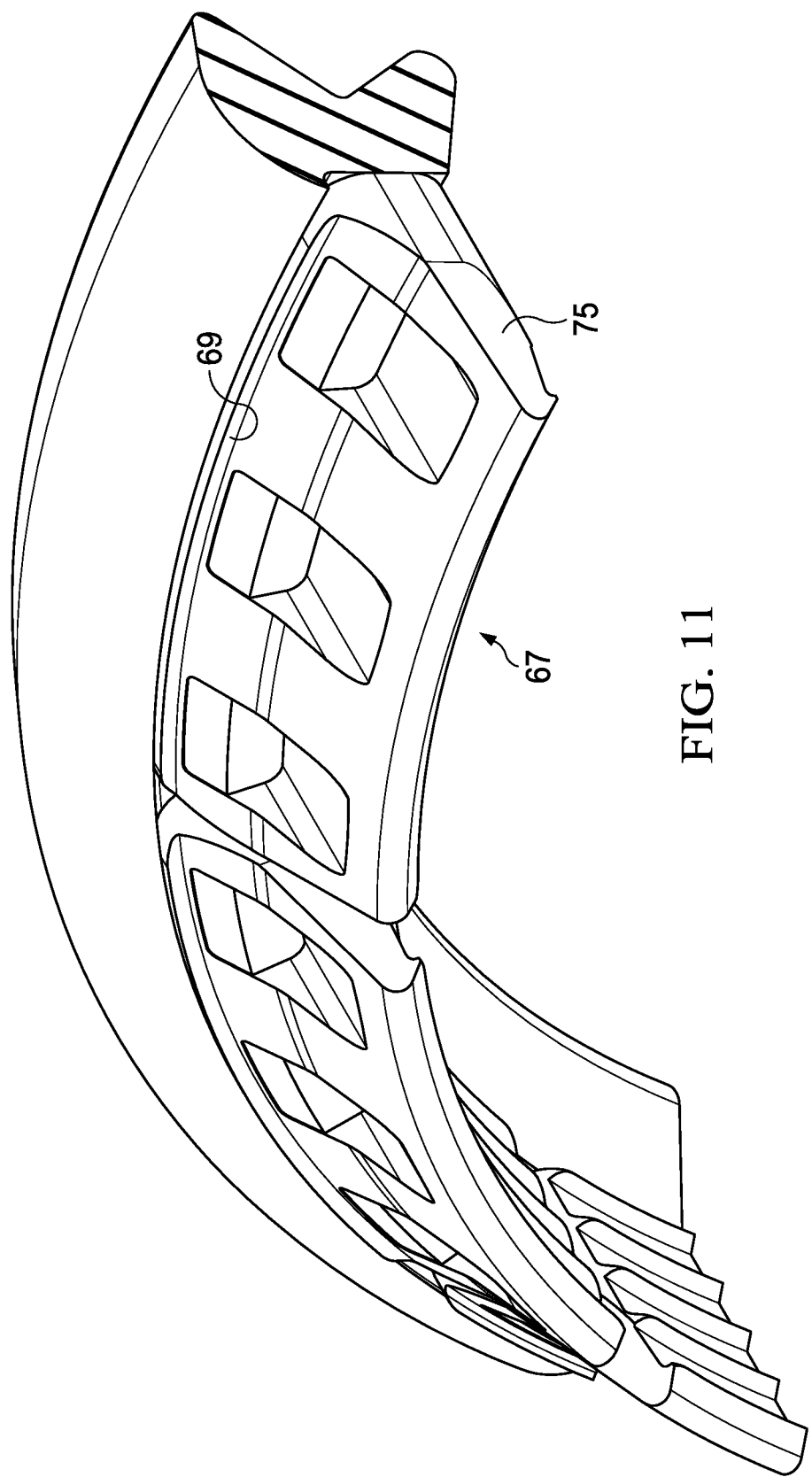
FIG. 11 is a view similar to FIG. 3, but showing of a portion of three gripping segments used in this version of the gasket of the invention.

In the twelve segment version of the invention shown in FIGS. 10 and 11, the gap between adjacent segments is larger than in the previous version. In this version of the invention, the gap between adjacent segments is between about 2 and 10 mm. Preferably, between about 3 to 5 mm. Preferably, there is no rubber material located between the end surfaces of the adjacent gripping segments, or any rubber which happens to be extruded here is minimal in nature.

FIG. 15 is an isolated view of one of the twelve gripping segments used in the assembly of FIG. 10. The corner regions 71 of each basic 30° segment arc are reduced by about 0.4° on each side to provide a "trim fit" for easier installation.

Figure 12:
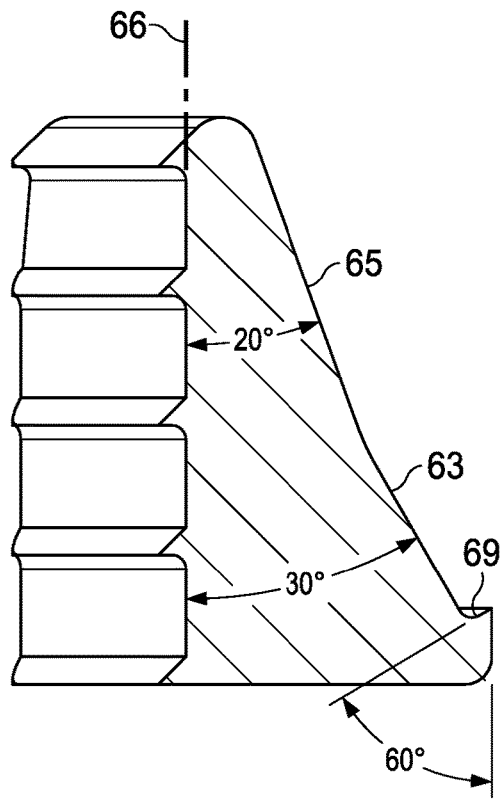
FIG. 12 is a sectional view of a portion of a gripping segment of the type used in the version of the invention shown in FIG. 11.
Figure 13:
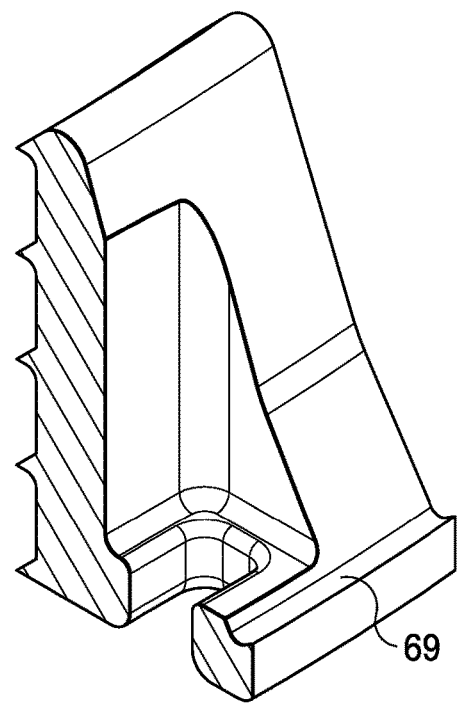
FIG. 13 is a plan view of a portion of the gripping segment of FIG. 11 showing the teeth and sharp edge region of the gripping segment.
Figure 14:
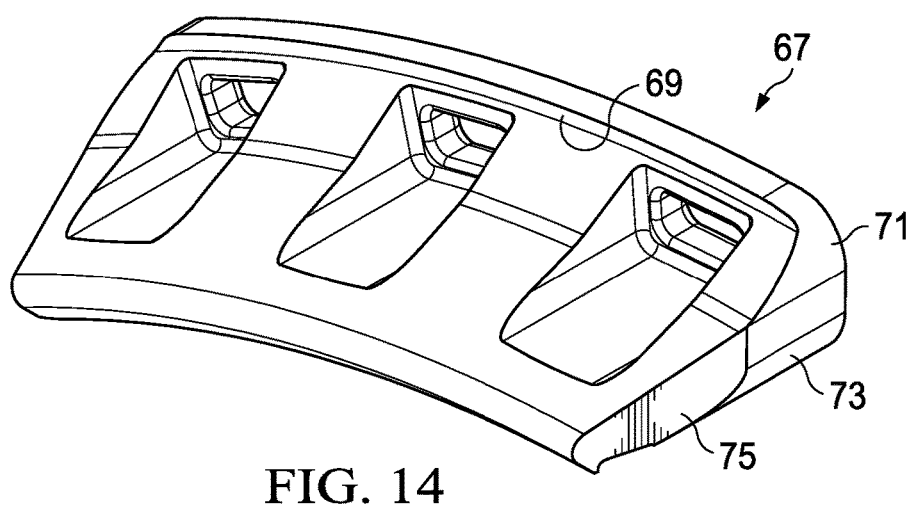
FIG. 14 is an isolated view of one of the gripping segments used in the version of the sealing and restraining gasket shown in FIGS. 10 and 11.

FIG. 12 also illustrates in more detail what might be called the "wedge" pan of the gripping segment. As can be seen in FIG. 12, the tip region 65 of the segment is formed at a 20° degree angle with respect to the vertically drawn axis 66. This region forms the "wedge part' of the segment. The rest of the segment up to the sharp ridge 69 at the top is formed at a 30° degrees angle with respect to die axis 66.

Since the raceway angle is 30 degrees, the "wedge" doesn't match, instead, it is off by 10 degrees. Instead it wedges between the spigot and the arc that joins the raceway to the lip of the female belled pipe end. This aspect of the design has several functions:

1. At 20 degrees, this "wedge" surface provides better mechanical advantage than a 30 degree interface. As a result, it helps promote engagement by wedging.

2. When the segments slide back and open to let the spigot in during assembly of the pipe joint, they follow this 20 degree wedge angle. This causes die sharp ridge on the socket side to move away from the 30 degree slope in the raceway. This action consequently enforces a delay in engagement of the ridge 69. When the spigot is pulled out, the wedge again follows (approximately due to pipe deformation) this 20 degree slope, allowing the teeth on the spigot to engage first. Then the ridge 69 on the socket side comes into contact again and prevents or limits further gripping action, as has been described.

In the view of the twelve segment version of the invention shown in FIG. 10, the elastomeric sealing region of the gasket is molded on the gripping segments with the segments in the "closed" position shown. The gripping segments side surfaces do not touch. The gap between the adjacent gripping segments is adjusted based on installation trials to make the gap as small as possible to achieve satisfactory ease of assembly. The smaller the gap, generally the better sealing and gripping performance achieved. FIG. 16 shows the components of the assembly in the stress-free state.

In operation, the combination sealing gasket and gripping mechanism is inserted within the female pipe mouth opening in a post manufacturing, thus requiring the body to retain some degree of flexibility for ease of insertion. Once the sealing and restraint gasket is in place, the mating male pipe is installed within the end opening of the mouth region of the female pipe section by pushing the male pipe within the end opening. Upon insertion of the male pipe end, the sealing and restraint system contacts the external surface of the mating mate pipe in order to both seal and restrain the mating male pipe and form a secure pipe joint.

An invention has been provided with several advantages. The combination sealing and restraint system of the invention is capable of joining and sealing molecularly oriented plastic pipe sections having "30/60" angular raceways. The system of the invention is relatively simple in design and economical to manufacture and docs not require any drastic changes in existing molecular pipe manufacturing processes or components. The present invention can be used to join mating plastic pipe sections without the need for external mechanical restraint components which complicate assembly and can be subject to corrosion or deterioration in use. The positive stop regions provided on the gripping segments which contact the mouth region of the pipe bell allow the ultimate gripping force of the gripping teeth to be more effectively controlled where the mating male pipe is made of PVC-O. The rounded edges and chamfered side regions of the gripping segments provide additional case of installation without unduly affecting sealing and gripping performance.

What is claimed is:

1. A combination sealing and restraint system for insertion within a 30/60 annular groove provided within a mouth region located adjacent an end opening of a female section of PVC-O plastic pipe capable of both sealing and restraining the female section of pipe to a mating male pipe having an interior surface and an exterior surface, to thereby form a sealed and retrained pipe joint, the sealing and restraint system comprising:

an annular gasket body made of a resilient elastomeric material, the annular gasket body having an inner circumferential region and an outer circumferential region, the annular gasket body being installed within the annular groove provided in the mouth region of the female section of plastic pipe so that the outer circumferential region forms a seal with the mouth region and the inner circumferential region forms a sealing surface for a mating male pipe;

a plurality of arcuate rigid gripping segments extending outwardly from the annular gasket body at a predetermined spacing around the circumference of the annular gasket body;

wherein the gripping segments are comprised of an inner surface, an outer surface separated by a thickness, a front edge and a rear edge, and opposing end surfaces, and wherein the inner surface of each segment has at least one row of gripping teeth capable of engaging selected points on the exterior surface of the mating male pipe and apply a gripping force to the exterior surface as the male pipe is inserted within the mouth opening of the female pipe during assembly of the pipe joint;

wherein the outer surface of each gripping segment has a sharp circumferential ridge formed thereon adjacent the rear edge thereof, the sharp ridge being positioned so as to contact the 30/60 annular groove provided in the mouth region of the PVC-O female pipe section during assembly of the pipe joint to prevent further sliding of the male pipe relative to the female pipe after initial gripping of the male pipe has occurred during the assembly of the pipe joint;

wherein each of the gripping segments has a side chamfered region joined to a relatively straight region on each of the opposing end surfaces thereof, the side chamfered region serving to reduce clash between adjacent gripping segments during installation of the male pipe section within the female pipe section to make up the pipe joint;

wherein the opposing end surfaces of each of the gripping segments are separated by a predetermined gap at a base region thereof with no filler material being located in the gap, the gap increasing in size at the chamfered region from the rear edge to the front edge thereof in a continuous manner, the size of the gap in both regions being selected to balance ease of assembly versus sealing performance when the pipe joint is assembled, the gap closing during assembly so that at least some contact is made at the base regions of the opposing end surfaces of adjacent gripping segments to thereby further prevent additional sliding of the male pipe relative to the female pipe after initial gripping of the male pipe has occurred during the assembly of the pipe joint; and wherein the gripping segments also have rounded rear edges as well as rounds on the end faces to aid in installation.

2. The combination sealing and restraint system of claim 1, wherein the gap at the base region of adjacent segments is between about 2 and 10 mm.

3. The combination sealing and restraint system of claim 2, wherein there is no rubber section located between the opposing end surfaces of the adjacent gripping segments.

4. The combination sealing and restraint system of claim 1, wherein each of the gripping segments as a plurality of openings therein which constitute lock regions which cooperate with mating portions of the resilient elastomeric material of the gasket body, whereby the gripping segments are mechanically secured to the gasket body.

5. The combination sealing and restraint system of claim 4, wherein the gasket body is injection molded about the gripping segments during manufacture so that the rubber of the gasket body flows into the lock regions of the gripping segments to mechanically secure the gripping segments to the gasket body during the injection molding operation.

6. The combination sealing and restraint system of claim 1, wherein the gripping segments and the resilient elastomeric material of the gasket body are chemically bonded together.

7. The combination sealing and restraint system of claim 1, wherein the gripping segments are made of metal.

8. The combination sealing and restraint system of claim 1, wherein there are six or more gripping segments arranged in circumferential fashion about the resilient elastomeric gasket body.

9. A combination sealing and restraint system for insertion within a 30/60 annular groove provided within a mouth region located adjacent an end opening of a female section of PVC-O plastic pipe capable of both sealing and restraining the female section of pipe to a mating male pipe having an interior surface and an exterior surface, to thereby form a sealed and retrained pipe joint, the sealing and restraint system comprising:
- an annular gasket body made of a resilient elastomeric material, the annular gasket body having an inner circumferential region and an outer circumferential region, the annular gasket body being installed within the annular groove provided in the mouth region of the female section of plastic pipe so that the outer circumferential region forms a seal with the mouth region and the inner circumferential region forms a sealing surface for a mating male pipe;
- a plurality of arcuate rigid gripping segments extending outwardly from the annular gasket body at a predetermined spacing around the circumference of the annular gasket body;
- wherein the gripping segments are comprised of an inner surface, an outer surface separated by a thickness, a front edge and a rear edge, and opposing end surfaces, and wherein the inner surface of each segment has at least one row of gripping teeth capable of engaging selected points on the exterior surface of the mating male pipe and apply a gripping force to the exterior surface as the male pipe is inserted within the mouth opening of the female pipe during assembly of the pipe joint;
- wherein the outer surface of each gripping segment has a sharp circumferential ridge formed thereon adjacent the rear edge thereof, the sharp ridge being positioned so as to contact the 30/60 annular groove provided in the mouth region of the PVC-O female pipe section during assembly of the pipe joint to prevent further sliding of the male pipe relative to the female pipe after initial gripping of the male pipe has occurred during the assembly of the pipe joint;
- wherein each of the gripping segments has a side chamfered region joined to a relatively straight region on each of the opposing end surfaces thereof, the side chamfered region serving to reduce clash between adjacent gripping segments during installation of the male pipe section within the female pipe section to make up the pipe joint;
- wherein the opposing end surfaces of each of the gripping segments are separated by a predetermined gap at a base region thereof with no filler material being located in the gap, the gap increasing in size at the chamfered region, from the rear edge to the front edge thereof in a continuous manner, the size of the gap in both regions being selected to balance ease of assembly versus sealing performance when the pipe joint is assembled, the gap closing during assembly so that at least some contact is made at the base regions of the opposing end surfaces of adjacent gripping segments to thereby further prevent additional sliding of the male pipe relative to the female pipe after initial gripping of the male pipe has occurred during the assembly of the pipe joint;
- wherein the gripping segments also have rounded rear edges as well as rounds on the end faces to aid in installation; and
- wherein there are twelve gripping segments arranged in circumferential fashion about the resilient elastomeric gasket body, each covering a 29.2° arc so that the segments produce approximately 350.4 degrees of contact with the mating male plastic pipe during assembly of the pipe joint.

10. The combination sealing and restraint system of claim 1, wherein the annular gasket body, when viewed in cross section, includes a leading nose region and a radially inwardly slanting sealing surface which forms a lip seal for engaging the mating male pipe end during insertion.

11. A method of forming a pipe joint, the method comprising the steps of:
- providing a fluid piping system including at least one PVC-O female pipe section having a mouth region adjacent an end opening thereof, the mouth region having a 30/60 annular groove therein, the end opening of the female PVC-O pipe section being sized to receive a mating male plastic pipe section having an interior surface and an exterior surface;
- in a post-pipe manufacturing operation, installing a sealing and restraining system within the annular groove provided in the end opening of the female plastic pipe section, the sealing and restraining system having an annular ring-shaped body made at least in part of a resilient elastomeric material, the ring-shaped body having an inner circumferential region and an outer circumferential region, the ring shaped body being installed within the annular groove provided in the mouth region of the female pipe section fitting so that the outer circumferential region forms a seal with the fitting mouth region and the inner circumferential region forms a sealing surface for the mating male pipe section;
- wherein a plurality of integrally formed gripping segments are provided for applying a gripping force to a mating male pipe, each having an outer planar surface extend outwardly from the annular gasket body at a predetermined spacing around the circumference of the annular gasket body, the spacing being sufficient to allow the gasket body to be flexed to thereby allow the sealing and restraint system to be installed in the mouth region of the pipe fitting as a post-manufacturing operation;
- wherein the gripping segments are each comprised of an inner surface, an outer surface separated by a thickness, and opposing end surfaces, and wherein the inner surface of each segment has at least one row of gripping teeth capable of engaging selected points on the exterior surface of the mating male pipe and apply a gripping force to the exterior surface;
- wherein the gripping segments are separated by a predetermined gap, the size of the gap being selected to balance ease of assembly versus sealing performance when the pipe joint is assembled, the gap closing during assembly so that at least some contact is made between the end surfaces of adjacent gripping segments;
- wherein the outer surface of each gripping segment is provided with a sharp circumferential ridge formed thereon adjacent the rear edge thereof, the sharp ridge being positioned so as to contact the 30/60 annular groove provided in the mouth region of the PVC-O female pipe section during assembly of the pipe joint to act as a positive stop and thereby prevent further sliding of the male pipe relative to the female pipe after initial gripping of the male pipe has occurred during the assembly of the pipe joint;

wherein each of the gripping segments is also provided with a side chamfered region joined to a relatively straight region on each of the opposing end surfaces thereof, the side chamfered region serving to reduce clash between adjacent gripping segments during installation of the male pipe section within the female pipe section to make up the pipe joint;

wherein the opposing end surfaces of each of the gripping segments are separated by a predetermined gap at a base region thereof with no filler material being located in the gap, the gap increasing in size at the chamfered region, from the rear edge to the front edge thereof in a continuous manner, the size of the gap in both regions being selected to balance ease of assembly versus sealing performance when the pipe joint is assembled, the gap closing during assembly so that at least some contact is made at the base regions of the opposing end surfaces of adjacent gripping segments to thereby further prevent additional sliding of the male pipe relative to the female pipe after initial gripping of the male pipe has occurred during the assembly of the pipe joint; and further comprising the steps of thereafter installing a mating male pipe within the end opening of the mouth region of the female plastic pipe section by pushing the male pipe section into the mouth opening of the female pipe section, the sealing and restraint system contacting the external surface of the mating male pipe in order to both seal and restrain the mating male pipe and form a secure joint.

* * * * *